Figure 1:
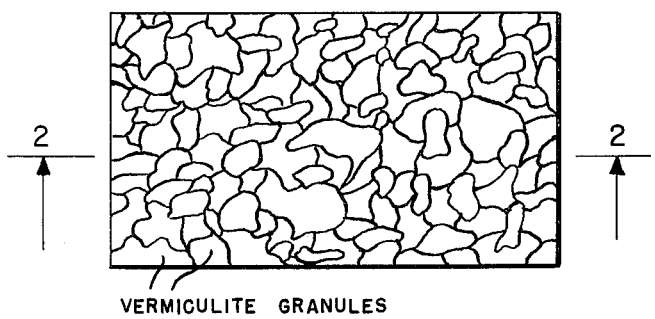

VERMICULITE GRANULES

VERMICULITE GRANULES
BITUMINOUS COATING
BITUMEN SATURATED FELT

INVENTOR
MORRIS KLIMBOFF
BY

ATTORNEY

United States Patent Office 3,207,619
Patented Sept. 21, 1965

3,207,619
BITUMINOUS ROOFING AND SIDING MATERIAL COATED WITH EXFOLIATED VERMICULITE
Morris Klimboff, Wayne, N.J., assignor, by mesne assignments, to The Flintkote Company, a corporation of Massachusetts
Filed Apr. 14, 1961, Ser. No. 102,947
3 Claims. (Cl. 117—27)

This invention relates to a new roofing and siding product and more particularly to a bituminous type roofing and siding product having an improved weathering surface and a process for preparing the same.

For many years vast quantities of roofing have been sold generally composed of a foundation layer or base which is usually a felted fibrous layer made up of paper and/or rag and/or asbestos fiber. The felt is usually saturated with a water-proofing substance such as bituminous composition, for instance, a low melting point bitumen. The felt is usually coated on one or both of its faces with a higher melting point bitumen. While the bitumen is still in a plastic state granules are ordinarily pressed therein on the weather exposed face to protect the bitumen from the ultra violet rays or actinic of the sun as well as to form a decorative coating. The bitumen coating would otherwise deteriorate producing cracking or crazing, thus permitting leaking on the roof in due time. Therefore, the granules have been materials which are opaque to ultra violet light either as such or are pigment coated to make them more opaque and/or more decorative. There are a number of coating methods, the most common of which is coating with a pigmented sodium silicate which is then subjected to heat in a kiln to set the silicate on the granular surface. Granules coated in this usual manner are applied also to other roofing products such as sheets of roofing material known as surfaced roll roofing. They are also used on siding products which are usually made of a fiber board coated with a plastic bitumen and having granules impressed in the surface. The granules which have been most widely used are formed from rock, such as crushed slate and traprock and preferably from light colored rock which facilitates coloring the granules in light colors as well as in darker colors. The lighter colors may be preferred in some cases because of their heat reflecting properties. Many different materials have been suggested as a substitute for rock granules although the latter are still in widest use by manufacturers of roof coverings. The substitutes usually suggested are granules formed from a hard and durable material which itself was opaque to damaging radiation or which was treated in some manner to make it so. Also, the proposed substitutes were often natively resistent to water permeability or absorbtion in the same general order as the widely used rock granules or were to be treated in some manner in order to reduce water absorption, particularly where the proposed granules were such that expansion of moisture on freezing would cause it to readily flake or peel.

I have discovered, quite by accident, that a roof covering or shingle having advantages over those presently used can be made by employing granules whose properties are in most respects the opposite of those which have been usually considered desirable in the past. Rather than being rock like, it is soft enough so that it can be compressed to a noticeable degree by the fingers. Rather than having a low water absorption, it will absorb water in large amounts, and it is unnecessary to treat the material specially in order to reduce water absorption. It is also flaky and friable material. Apparently, because of these properties, it has never been suggested for use as a roofing granule even though it is a material which is in wide use in the building material industry. Nevertheless, I have now established that a roof covering comprising my new granules will have the following advantages over those now being marketed in large quantities:

(1) A lighter weight roofing and siding product is produced with lower shipping cost and easier handleability.

(2) Dark colors as well as light colors show excellent heat reflectivity.

(3) In addition to being heat reflective, the granules also insulate by virtue of having low heat conductivity.

(4) Embedding pressures applied to the granules on the roofing machine can be increased without bleeding of bitumen.

(5) Variegated colors are obtainable from a single granule hopper and new color effects are possible.

(6) Stain tests show excellent resistance to radiant heat stain.

Exfoliated vermiculite is a well known material having substantial usefulness as a lightweight plaster and cement aggregate, as a soil lightner in agriculture, as a poured insulation fill material, etc. Vermiculite is an alteration product of certain micaceous minerals of the biotite, phlogopite or pyroxenite type, which exfoliates or expands up to many times their original size depending upon water content upon the application of heat to produce a lightweight granular mineral material. It is semi-plastic or compressible in a direction perpendicular to its many laminae and tends to split along cleavage planes when subjected to severe handling. I have discovered, nevertheless, that exfoliated vermiculite is unexpectedly suitable for use as a granule and furthermore entails several advantages over granules previously used.

It is, therefore, an object of the present invention to provide a method and means for producing a new and improved roofing and siding product having a decorative appearance. It is a further object of the present invention to provide an improved roofing and siding product which is lighter in weight than the comparable rock granule coated product. It is a further object of the present invention to provide an improved roofing and siding product which has greater insulating value than the comparable rock granule coated product.

These and other objects are attained by the present invention which relates generally to a roofing and siding product comprising a base, a bituminous coating on the base, and exfoliated vermiculite pressed into the surface of the bituminous material to form a substantially continuous weather resistant coating.

Figure 2:
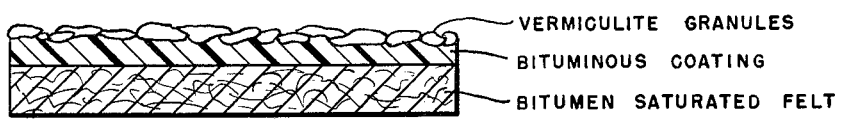

The foregoing and other objectives, features and advantages hereof will become apparent from the following detailed description and the drawings which form a part hereof and in which:

FIGURE 1 is a plan view of the product of the invention; and FIGURE 2 is a cross-sectional view thereof taken along the line 2—2 of FIGURE 1 looking in the direction of the arrows.

The vermiculite need not be fully expanded, or it may be a type of vermiculite which is incapable of the degree of expansion found in the commercial grades of vermiculite. Expansion or exfoliation should be accomplished to a degree such that the material is opaque to the passage of ultra violet light. Partially expanded material may be somewhat less fragile than fully expanded material and may be somewhat more fire resistant since material partially expanded and capable of further expansion may accomplish this further expansion upon the application of severe heat as from a burning brand and for this reason may be more fire resistant. Partial expansion may be obtained by heating at a temperature in the nature of 700° F. for a period of several minutes as compared with higher temperatures in the nature of 1200° F. customarily used for full expansion or for substantial lengths of time at the lower temperature. For purposes of this application, I define partially expanded material as material which will occupy from about ⅓ to about ¾ of the volume of fully expanded commercial grade vermiculite.

The exfoliated vermiculite may be pigmented. This can be accomplished by the method commonly used for applying weather resistant pigmented coating to a roofing granule involving a mixture of pigment and a binder such as sodium silicate set on the surface of the material by a heating treatment. The sodium silicate and pigment may be applied prior to expansion of the vermiculite or may be applied after expansion. When the pigment is applied prior to expansion and applied to a base material, a substantial variegated effect is obtained because only part of the exposed material is pigmented and a part is unpigmented.

The invention may also be understood by reference to the following examples but it will be understood that variations and substitutions may be made within the scope of the claims.

Example 1

Unexfoliated vermiculite, No. 3 grade, screened so as to have a mesh size passing a 6 mesh screen and retained on a 12 mesh screen is heated in a rotary kiln at a temperature of about 700° F. for about 12 minutes. The resultant partially expanded vermiculite may then be delivered to a hopper from which it may be dropped onto a moving web of saturated fibrous felt coated with asphalt. The particles of the expanded vermiculite are delivered onto the layer of asphalt coating at a rate such that after the layer has been roll pressed and the excess vermiculite removed, the layer of vermiculite adhered as a surfacing for the coating will amount to about 32 pounds thereof per 240 square feet. (A square of roofing shingles having 100 sq. ft. exposed). The thus prepared sheet may then be cut into shingles of the desired size and shape, in accordance with conventional practice.

Example 2

To 2000 lbs. of unexpanded African vermiculite, No. 3 grade, having a mesh size of −6 +12 is added a mixture of 25 lbs. red iron oxide, 15 lbs. gray Portland cement, 35 lbs. water, and 133 lbs. sodium silicate having a ratio $Na_2O$ to $SiO_2$ of 1:3.22 and a 37.6% solids content. After mixing the material is passed through a drying oven on a belt for about four minutes at a temperature of about 230° F. The dried material is then passed through a rotary kiln at about 700° F. for about twelve minutes. The colored and partially exfoliated vermiculite was then applied to a roofing shingle in the usual manner wherein it was dropped from a hopper onto a moving web of roofing felt coated with coating asphalt, roll pressed into the surface of the web, the excess vermiculite removed, and the sheet cut into shingles. Shingles made in this manner have been applied to a roof surface exposed for a substantial period of time and walked upon. No deterioration was noted due to the weather including freezing and the color did not change on exposure.

The insulation effect of the vermiculite surfacing was illustrated by a test comparing a commercial shingle having white pigmented stone granules on the surface and a vermiculite coated shingle as above but having a white pigment such that it was partially white and partially uncolored. Both shingles were placed side by side on steel plates and subjected to the same heat source, which was an infrared lamp, for 55 minutes. The stone granule coated shingle had a surface temperature of 185° F. and had adhered to the steel plate. The vermiculite coated shingle had a surface temperature of 115° F. and had not adhered to the steel plate.

Where color fastness is important, a vermiculite material should be used which contains the lowest available amounts of compounds which subsequently are altered by exposure to atmospheric conditions; for example the lowest available amount of iron or iron compounds. In this respect African vermiculite commercially available has satisfactory color fastness properties since upon exposure it did not change color whereas a grade of vermiculite mined in the United States had turned dark after a few months exposure to the weather. This is apparently due to the higher iron content. Thus, vermiculite having an iron content of less than 6% by weight is preferable to vermiculite having an iron content of above 6%, based on the unexpanded material, when good color fastness is desired.

In addition to asphalt shingles, the exfoliated vermiculite may be applied to built up roofing, roll roofing, and siding products including insulation siding. One type of roofing application now in use involves spraying chopped glass fiber together with asphalt emulsion on a roof surface and the exfoliated vermiculite may be pressed on the surface of this type of roof, particularly for decorative and fire resistant effects.

By bitumen or bituminous as used herein I refer to asphalt and coal tar pitch and variations thereof commonly used in roofing manufacture. The amount of exfoliated vermiculite suitable for covering 240 sq. ft. of shingle surface which is usually referred to as a square of shingles since when applied the exposed surface measures 100 sq. ft. and may contain from 15 to 35 lbs. of exfoliated vermiculite depending upon the size and degree of exfoliation and whether or not the vermiculite is coated with pigment. Various sizes of vermiculite may be used and particles up to about ½ inch in diameter have been found satisfactory although there would usually be a mixture of a number of sizes. The weight compares with about 64 lbs. of pigmented rock granules commonly used on a square of shingles. It will be understood by those skilled in the art that the exfoliated vermiculite is used on the face of the shingle to be exposed to the weather. Mica and sometimes unexfoliated vermiculite have been used on the unexposed side of the shingle primarily to prevent adherence of the shingles in a bundle.

Shingles coated with the exfoliated vermiculite absorb more rain water than rock coated shingles. However, this has no apparent adverse effect since the water dries out. Samples have been exposed to 200 freeze thaw cycles and the formation of ice particles in the vermiculite has not caused deterioration. Furthermore, the roofing has been walked on during and after installation and no destruction of the surface was noted.

What I claim is:

1. A bituminous roofing and siding material of light weight, increased insulation, fire resistance and decorative appeal, and having a substantial resistance to weather deterioration and foot traffic comprising a fibrous base saturated with a bitumen, a layer of relatively high melting point bitumen applied to the side of said fibrous base which is to be exposed to the weather and a surfacing layer adhered to said layer of relatively high melting point bitumen comprising vermiculite granules which are exfoliated at least to the extent of being opaque to the effects of the actinic rays of the sun.

2. The product of claim 1 wherein the vermiculite granules are only partially exfoliated.

3. The product of claim 1 and further including a coating of a pigment containing heat set binder on said vermiculite granules, said coating being applied to said vermiculite granules prior to exfoliation thereof.

References Cited by the Examiner

UNITED STATES PATENTS

| | | | |
|---|---|---|---|
| 1,719,118 | 7/29 | Lukens et al. | 117—32 |
| 2,077,094 | 4/37 | Byers | 117—106 |
| 2,112,194 | 3/38 | Harshberger | 11—130 |
| 2,332,221 | 10/43 | Harshberger | 117—32 |
| 2,495,540 | 1/50 | Nichols et al. | |
| 2,857,541 | 10/58 | Etzel | 117—33.5 |

OTHER REFERENCES

Zonolite-Vermiculite, 1954, pp. 4, 11–13.

WILLIAM D. MARTIN, *Primary Examiner.*

RICHARD D. NEVIUS, *Examiner.*